3,317,537
PIPERAZINOALKYL-MORPHANTHRIDINES
Alexander E. Drukker, Milwaukee, and Claude I. Judd, Mequon, Wis., assignors to Colgate-Palmolive Company, New York, N.Y., a corporation of Delaware
No Drawing. Filed June 25, 1965, Ser. No. 467,097
2 Claims. (Cl. 260—268)

This invention relates to novel chemical compounds and processes of preparing the same. More particularly, this invention is concerned with novel basic 5,6-dihydromorphanthridine derivatives, processes of producing them and pharmacological and therapeutic uses for such compounds.

This application is a continuation-in-part of copending application Ser. No. 304,241, filed Aug. 23, 1963, now U.S. Patent No. 3,267,094, which is a continuation-in-part of copending application Ser. No. 223,263, filed Sept. 12, 1962, now abandoned, which is a continuation-in-part of Ser. No. 97,159, filed Mar. 21, 1961, now abandoned.

According to the present invention there are provided novel basic 5,6-dihydromorphanthridines of the formula

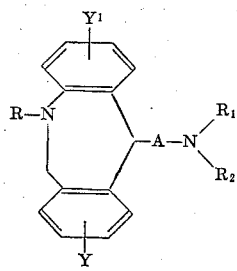

wherein Y and $Y^1$ are hydrogen, halo groups and particularly chloro and bromo, lower alkoxy such as methoxy and ethoxy, lower alkyl such as methyl and ethyl, thiolower alkyl such as thiomethyl and thioethyl, and trifluoromethyl, R is hydrogen, a lower alkyl (viz., eight carbons or less) such as methyl, ethyl, propyl, isopropyl and butyl, a lower alkenyl such as allyl, an aralkyl such as phenyl-lower alkyl including benzyl, phenethyl, phenylpropyl, phenylisopropyl, p-chlorobenzyl, benzhydryl, trityl or a phenyl-lower alkenyl such as cinnamyl, A is a lower straight or branched alkylene advisably of 1 to 5 carbons such as methylene, ethylene or propylene, and

represents piperazino.

Such compounds are produced by reacting an 11-alkali metal salt of a 5-substituted-5,6-dihydromorphanthridine with the appropriate disubstituted aminoalkylhalide or disubstituted aminoalkyl para-toluenesulfonate. This process can be represented as follows:

wherein M is an alkali metal and particularly is lithium, sodium or potassium, X is a reactive halogen and particularly is chlorine, bromine or iodine, or the p-toluenesulfonate group, and Y, $Y^1$, A, R, $R_1$ and $R_2$ have the significance previously assigned but R is not hydrogen.

The 11-alkali metal salts of 5-substituted 5,6-dihydromorphanthridine used in the process are prepared by reacting a 5-substituted-5,6-dihydromorphanthridine with an alkali metal alkyl or aryl compound such as butyl lithium, phenyl lithium, propyl sodium and butyl potassium, advisably in about 10% excess. The reaction is readily effected by bringing the reactants together in an inert anhydrous liquid reaction medium such as ethyl ether, xylene, toluene, tetralin, cumene and tetrahydrofuran, and compatible mixtures of such solvents. The reaction can be effected at room temperature or elevated temperatures depending on the reactivity of the alkali metal compound used in the process. The reaction is substantially complete in 1 to 4 hours. Following termination of the reaction the product can be isolated, if desired, but this is ordinarily not done since it can be used as present in the reaction mixture.

Some of the 11-alkali metal salts of 5-substituted 5,6-dihydromorphanthridines which are produced as described are the 11-sodium, 11-potassium or 11-lithium salts of 5-methyl-5,6-dihydromorphanthridine, 5-ethyl-5,6-dihydromorphanthridine, 5-isopropyl-5,6-dihydromorphanthridine, 5-benzyl-5,6-dihydromorphanthridine, 5-phenethyl-5,6-dihydromorphanthridine, 5-allyl-5,6-dihydromorphanthridine and 5-cinnamyl-5,6-dihydromorphanthridine.

Reaction between the alkali metal salt of a 5-substituted-5,6-dihydromorphanthridine and the aminoalkyl halide, or p-toluenesulfonate, can be effected by bringing the reactants together, advisably in equimolar amounts, in a suitable inert high boiling liquid reaction medium such as dioxane, toluene, xylene, ethyl ether, tetralin, cumene and tetrahydrofuran. The reaction mixture from the formation of the 11-alkali metal salt of the 5-substituted 5,6-dihydromorphanthridine can be used as the reactant and solvent source to which the appropriate aminoalkyl halide reactant can be added. The reaction proceeds at room temperature although slightly elevated temperatures can also be used. About 3 to 20 hours is generally adequate to substantially complete the reaction. After the reaction is terminated the product can be recovered by filtering the reaction mixture, distilling off the solvent and fractionally distilling the high boiling base in vacuo.

The compounds having a trityl group on a nitrogen can be treated with a weak acidic solution, such as 50% acetic acid, to cleave the trityl group and produce compounds having a hydrogen in its place.

Compounds of this invention having a benzyl group on a nitrogen can be debenzylated by reacting them with a chloroformic acid ester or chlorothioformic acid ester to form an intermediate carbamate which then can be hydrolyzed to cleave the acyloxy group. This process as applied to piperazino groups can be represented as follows:

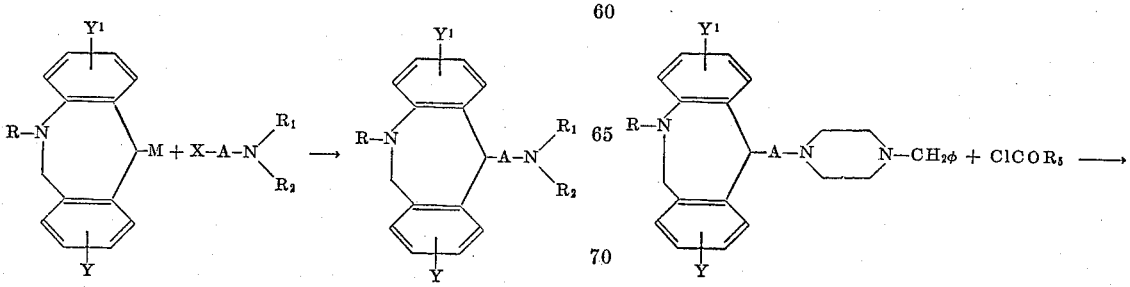

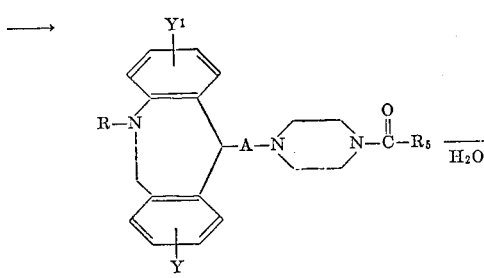

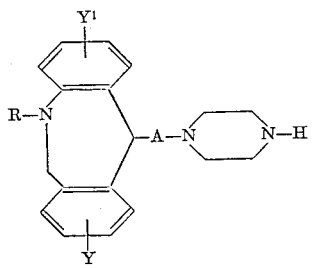

wherein R has the assigned meaning but is not benzyl, Y and $Y^1$ have the assigned meaning and $R_5$ is a lower alkoxy such as methoxy and ethoxy, a lower thioalkyl such as thiomethyl, thioethyl and thiopropyl, phenoxy and thiophenyl. The J. Org. Chem. 26, 4057 (1961) illustrates other applications of the process.

Among the chloroformates which can be used in the first step of the process are methyl chloroformate, ethyl chloroformate, phenyl chloroformate, methylthiochloroformate, ethylthiochloroformate and phenylthiochloroformate.

The debenzylation reaction is readily effected by bringing the reactants together in a suitable inert solvent at from about room temperature to about 200° C. Benzene is a particularly useful reaction medium and with it a reaction temperature of about 80° C. is suitable. Preferably, the reaction mixture is refluxed for about 5 to 20 hours before reaction is terminated. The intermediate carbamate is isolated from the reaction mixture by conventional methods.

The carboxy group can be cleaved by acid or base hydrolysis and preferably with a base such as barium, calcium, lithium, sodium or potassium hydroxide, or an acid such as acetic acid, hydrobromic acid, hydrochloric acid or p-toluene-sulfonic acid. The rate of hydrolysis is increased by heating the hydrolysis mixture, such as at reflux. Following the hydrolysis the reaction mixture can be neutralized and the product extracted.

Typical of the compounds produced by hydrolysis of the carboxy group are 5-methyl-11-(3-piperazinopropyl)-5,6 - dihydromorphanthridine, 5 - ethyl-11-(3-piperazino propyl)-5,6-dihydromorphanthridine and 5-methyl-11-(3-piperazinobutyl)-5,6-dihydromorphanthridine.

The compounds of this invention, other than the alkali metal salts, form water soluble acid addition salts with organic and inorganic acids such as hydrochloric acid, hydrobromic acid, sulphuric acid, phosphoric acid, methane sulphonic acid, ethane disulphonic acid, acetic acid, citric acid, maleic acid, succinic acid, tartaric acid, benzoic acid, and phthalic acid.

The compounds of this invention, other than the intermediate alkali metal salts, have anticholinergic and analgetic activity. They thus can be used in pharmacological studies and as screening agents. Actual use in animals and humans for these purposes is also indicated. In addition, these compounds have antispasmodic, antidepressant and tranquilizing effect. They can also be used as neutralizing agents and in purifying penicillin with which they form salts.

The compounds can be administered to animals as pure compounds, in the form of a pharmaceutically acceptable nontoxic acid addition salt, but to obtain a more practical size to dosage relationship one or more of the compounds is combined with a suitable pharmaceutical carrier and made into unit-dosage forms.

Pharmaceutical carriers which are liquid or solid can be used. The preferred liquid carrier is water. Flavoring materials can be included in the solutions as desired.

Solid pharmaceutical carriers such as starch, sugar and talc can be used to form powders. The powders can be used as such or be tableted, or be used to fill gelatin capsules. Suitable lubricants like magnesium stearate, binders such as gelatin and disintegrating agents like sodium carbonate in combination with citric acid can be used to form the tablets.

Unit dosage forms such as tablets and capsules can contain any suitable predetermined amount of one or more of the compounds and can be administered one or more at a time at regular intervals. Such unit dosage forms can contain 1 to 100 mgm. or more of an active compound of this invention. The total amount of active compounds administered must be ultimately fixed by reference to the disease to be treated.

A typical tablet can have the composition:

|  | Mg. |
|---|---|
| 11 - (3 - piperazinopropyl) - 5-methyl-5,6-dihydromorphanthridine dimaleate | 10 |
| Lactose | 136.5 |
| Corn starch | 20 |
| Corn starch (as 10% starch paste) | 3.4 |
| Magnesium stearate | 1.3 |

A 5/16 inch diameter standard concave punch is used to compress the composition into a tablet.

The following examples are presented to illustrate the invention.

*Example 1.—11-[3-(4-benzylpiperazino)-propyl]-5-methyl-5,6-dihydromorphanthridine*

To a solution of 12.5 g. (0.06 mole) of 5-methyl-5,6-dihydromorphanthridine in 100 ml. of tetrahydrofuran was added 44 ml. of butyl lithium solution (0.07 mole) in 100 ml. of ether. The resulting deep orange solution was stirred for 5 hours at room temperature after which a solution of 15.1 g. (0.06 mole) of 1-benzyl-4-(3-chloropropyl)piperazine in 100 ml. of ether was added dropwise. The solution was stirred for 20 hours at room temperature, 100 ml. of water was added, the organic layer was separated, dried, and concentrated to give 28 g. (100%) of a yellow oil.

*Analysis.*—Calcd. for $C_{29}H_{35}N_3$: C, 81.84; H, 8.29; N, 9.87. Found: C, 80.17; H, 8.39; N, 10.08.

*Example 2.—11-[3-(4-carbethoxypiperazinopropyl)]-5-methyl-5,6-dihydromorphanthridine*

A solution of 28 g. (0.066 mole) of 11-[3-(4-benzylpiperazinopropyl)] - 5 - methyl - 5,6 - dihydromorphanthridine and 8.7 g. (0.08 mole) of ethyl chloroformate in 100 ml. of benzene was refluxed for 24 hours. The solution was distilled with steam, the residue extracted with benzene, washed with dilute hydrochloric acid and water, dried over potassium carbonate, filtered, concentrated, and distilled to give 17.5 g. (63%) of the product as an oil, B.P. 250–280° C. (2.0 mm.).

*Analysis.*—Calcd. for $C_{25}H_{33}N_3O_2$: C, 73.67; H, 8.16; N, 10.31. Found: C, 73.54; H, 8.13; N, 10.04.

*Example 3.—11-(3-piperazinopropyl)-5-methyl-5,6-dihydromorphanthridine*

A solution of 17.5 g. (0.045 mole) of 11-[3-(4-carbethoxypiperazinopropyl)] - 5 - methyl - 5,6 - dihydromorphanthridine and 22 g. of barium hydroxide 8 $H_2O$ in 170 ml. of ethylene glycol was stirred and refluxed for 12 hours. The reaction mixture was poured into water, filtered, the filter residue washed with benzene and the filtrate extracted with benzene, the organic layer separated, dried over potassium carbonate, filtered, concentrated and distilled to give 11 g. (73%) of product, B.P. 220–230° C. (0.2 mm.).

The base was converted to the di hydrogen maleate by mixing alcoholic solutions of the base and of maleic acid. The salt was recrystallized from boiling ethanol; M.P. 167° C.

*Analysis.*—Calcd. for $C_{30}H_{37}N_3O_8$: C, 63.47; H, 6.57; N, 7.40. Found: C, 63.29; H, 6.68; N, 7.62.

The foregoing detailed description has been given for clearness of understanding only, and no unnecessary limitations should be understood therefrom, as modifications will be obvious to those skilled in the art.

What is claimed is:

1. A compound of the formula

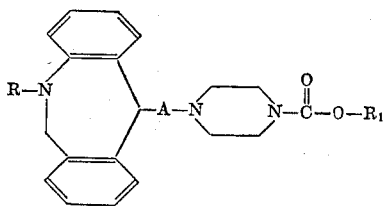

wherein R and $R_1$ are lower alkyl and A is lower alkylene.

2. 11 - [3 - (4 - carbethoxypiperazinopropyl)] - 5-methyl-5,6-dihydromorphanthridine.

References Cited by the Examiner

UNITED STATES PATENTS

| | | | |
|---|---|---|---|
| 2,800,474 | 7/1957 | Voegtli | 260—268 |
| 2,877,156 | 3/1959 | Janssen et al. | 167—65 |
| 2,951,082 | 4/1960 | Sprague et al. | 260—268 |
| 2,973,354 | 2/1961 | Werner | 260—268 |
| 2,981,736 | 4/1961 | Galliot et al. | 260—268 |
| 2,985,660 | 5/1961 | Judd et al. | 260—268 |
| 3,058,979 | 10/1962 | Ullyot | 260—268 |
| 3,068,147 | 12/1962 | Emele | 167—65 |
| 3,153,652 | 10/1964 | Drukker et al. | 260—268 |

OTHER REFERENCES

Zervas et al.: Journ. Am. Chem. Soc., vol. 78, pp. 1359–63 (1956).

ALEX MAZEL, *Primary Examiner.*

HENRY JILES, *Examiner.*

J. W. ADAMS, JR., *Assistant Examiner.*